Figure 1:
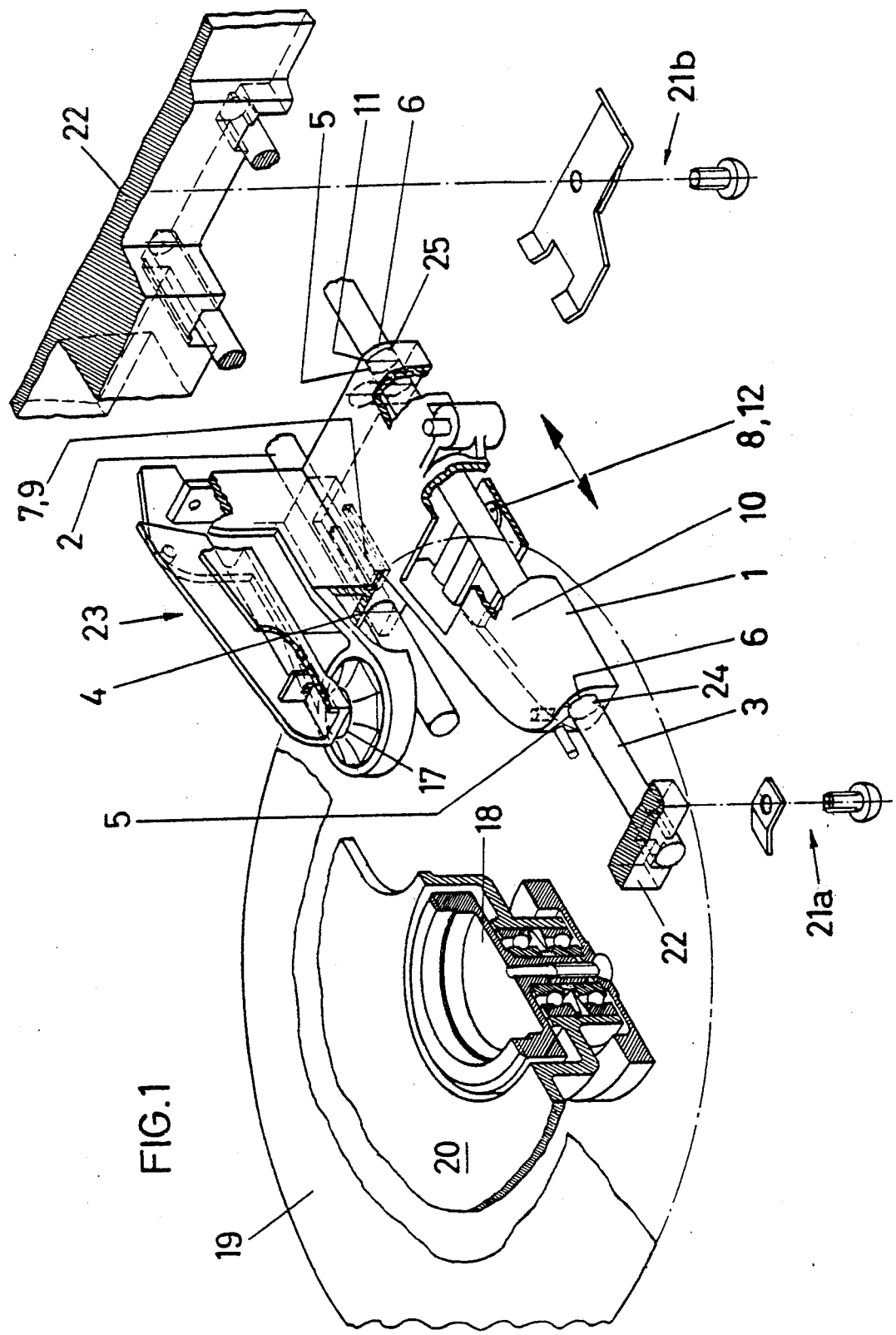

United States Patent [19]

Boehm et al.

[11] 4,441,130

[45] Apr. 3, 1984

[54] CARRIAGE FOR A SCANNING HEAD IN RECORDING AND/OR PLAYBACK APPARATUS FOR DISK RECORDS

[75] Inventors: Udo Boehm; Klaus Schulze-Berge, both of Ludwigshafen; Roland Brotzler, Hochdorf-Assenheim, all of Fed. Rep. of Germany

[73] Assignee: BASF Aktiengesellschaft, Ludwigshafen, Fed. Rep. of Germany

[21] Appl. No.: 327,101

[22] Filed: Dec. 3, 1981

Related U.S. Application Data

[63] Continuation of Ser. No. 117,130, Jan. 31, 1980, abandoned.

[30] Foreign Application Priority Data

Feb. 5, 1979 [DE] Fed. Rep. of Germany ... 7903033[U]

[51] Int. Cl.³ .............................................. G11B 21/08
[52] U.S. Cl. ...................................... 360/106; 360/97
[58] Field of Search ........................ 360/104, 106–107, 360/97–99, 133

[56] References Cited

U.S. PATENT DOCUMENTS

| 3,678,481 | 7/1972 | Dalziel et al. | 360/97 |
| 3,969,768 | 7/1976 | Ebbing | 360/107 |
| 4,071,866 | 1/1978 | Butsch | 360/106 |
| 4,114,183 | 9/1978 | Ganske et al. | 360/99 |
| 4,149,669 | 4/1979 | Hermstein et al. | 360/104 X |

FOREIGN PATENT DOCUMENTS 2643998  3/1978  Fed. Rep. of Germany ...... 360/106

OTHER PUBLICATIONS

IBM/TDB; vol. 18, No. 7, Dec. 1975, pp. 2244–2245, "Drive Band Read/Write Head Attachment", by Bailey.

*Primary Examiner*—John H. Wolff
*Attorney, Agent, or Firm*—Keil & Witherspoon

[57] ABSTRACT

A carriage for a scanning head in recording and/or playback apparatus for disk records, a first rod-shaped guide member being provided for the support and longitudinal guidance of the carriage, and a second rod-shaped guide member being provided for the transverse support of the carriage, wherein the carriage possesses at least one prism-shaped aperture for said first rod-shaped guide member, and at least one leaf spring presses the carriage against the rod-shaped guide members.

5 Claims, 11 Drawing Figures

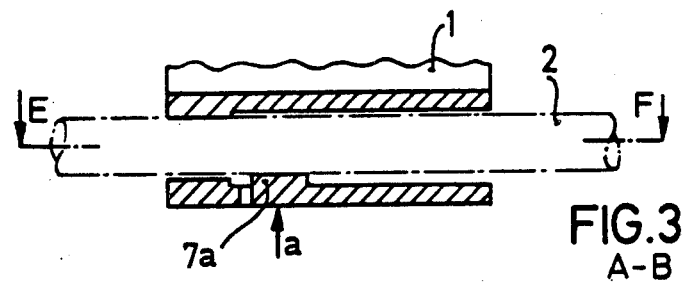
FIG.3a
A-B
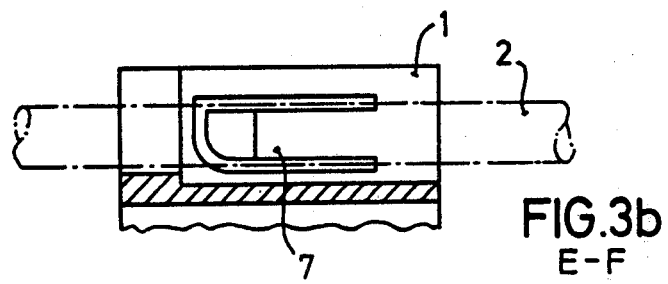
FIG.3b
E-F
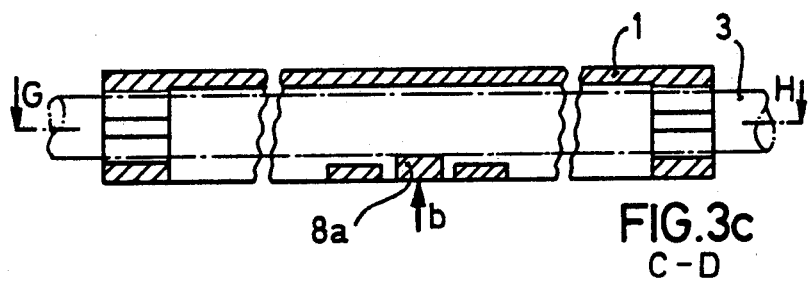
FIG.3c
C-D
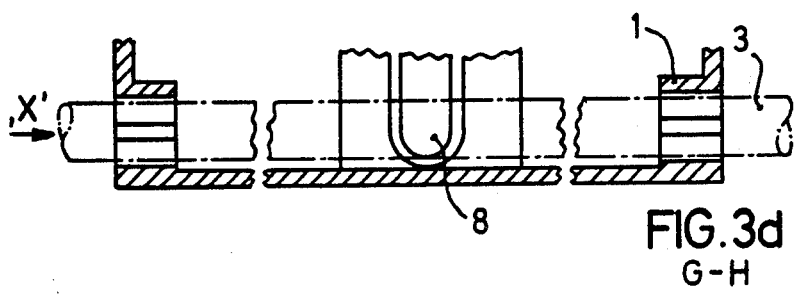
FIG.3d
G-H
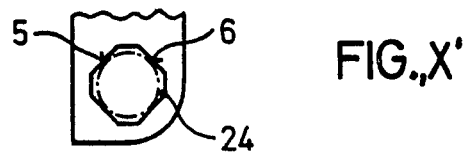
FIG.,X'

CARRIAGE FOR A SCANNING HEAD IN RECORDING AND/OR PLAYBACK APPARATUS FOR DISK RECORDS

This is a continuation of application Ser. No. 06/117,130, filed Jan. 31, 1980, now abandoned.

The present invention relates to a carriage for a scanning head in recording and/or playback apparatus for disk records, especially flexible magnetic disks in cartridges, a first rod-shaped guide member being provided for the support and longitudinal guidance of the carriage and a second rod-shaped guide member being provided for the transverse support of the carriage.

A carriage for a data storage apparatus employing flexible magnetic disks, referred to as floppy disks, is disclosed in U.S. Pat. No. 3,678,481. In addition to a guide rod, which passes through a long circular bore in the carriage, a parallel lead screw with a spiral groove is provided, and a rigid stylus attached to the carriage fits in this groove, transverse support, even though slight, of the carriage on the lead screw thus being provided. However, head guidance is not satisfactory.

It is an object of the present invention to provide a carriage of the said type, which functions extremely well and can be manufactured, and assembled, simply and economically.

We have found that this object is achieved with a carriage for a scanning head in recording and/or playback apparatus for disk records, especially flexible magnetic disks in cartridges, a first rod-shaped guide member being provided for the support and longitudinal guidance of the carriage and a second rod-shaped guide member being provided for the transverse support of the carriage, wherein the carriage possesses at least one prism-shaped aperture for at least one of the rod-shaped guide members, the shape of the aperture being symmetrical with respect to the axis of the rod-shaped guide member, and the contact between the periphery of the guide member and the walls of the aperture being a line contact, and wherein at least one leaf spring presses the carriage against at least one of the rod-shaped guide members.

It is thus possible to obtain very accurate play- and rattle-free guidance of the carriage, whilst ensuring that the carriage is simple to manufacture and assemble. Furthermore, it is possible to set a definite frictional resistance for longitudinal movement of the carriage, without the risk of excessive wear. The symmetrical shape of the prism-shaped aperture(s) has the advantage that movement of the carriage takes place in the axial plane, without the occurrence of tilting moments about the axis.

In a further embodiment, two coaxial prism-shaped bores arranged at a distance from one another are provided for one rod-shaped guide member. As a result, the expense of producing the prism-shaped bores can be reduced, since only short bores are required.

In an advantageous embodiment of the device according to the invention, a leaf spring is provided, on the carriage, for each rod-shaped guide member. In this way, the necessary pressure to be applied can be selected, as to magnitude and position, individually for each guide member, it being possible to arrange the leaf springs for the two rod-shaped guide members crosswise to the rod axes.

In a further advantageous embodiment, the leaf springs for the guide members are arranged lengthwise to the rod axes.

In yet another advantageous embodiment, a leaf spring for one of the guide members is arranged crosswise to the rod axis, and the leaf spring for the other guide member lengthwise to the rod axis.

As a result, the pressure applied can be suitably distributed in the lengthwise and crosswise directions, as a result of which tilting of the carriage is substantially eliminated.

In a practical embodiment, the carriage is made of a plastic and the leaf springs are preferably integral therewith.

The design according to the present invention is particularly advantageous in that the dimensional changes of plastics, for example with varying temperature, are taken into account. For example, if the leaf springs are made of the same material as the other parts of the carriage, they undergo the same dimensional changes as these parts.

With the design of the invention it is possible to achieve very precise positioning of the carriage and hence of the scanning head because the carriage is held in three planes.

Figure 2:
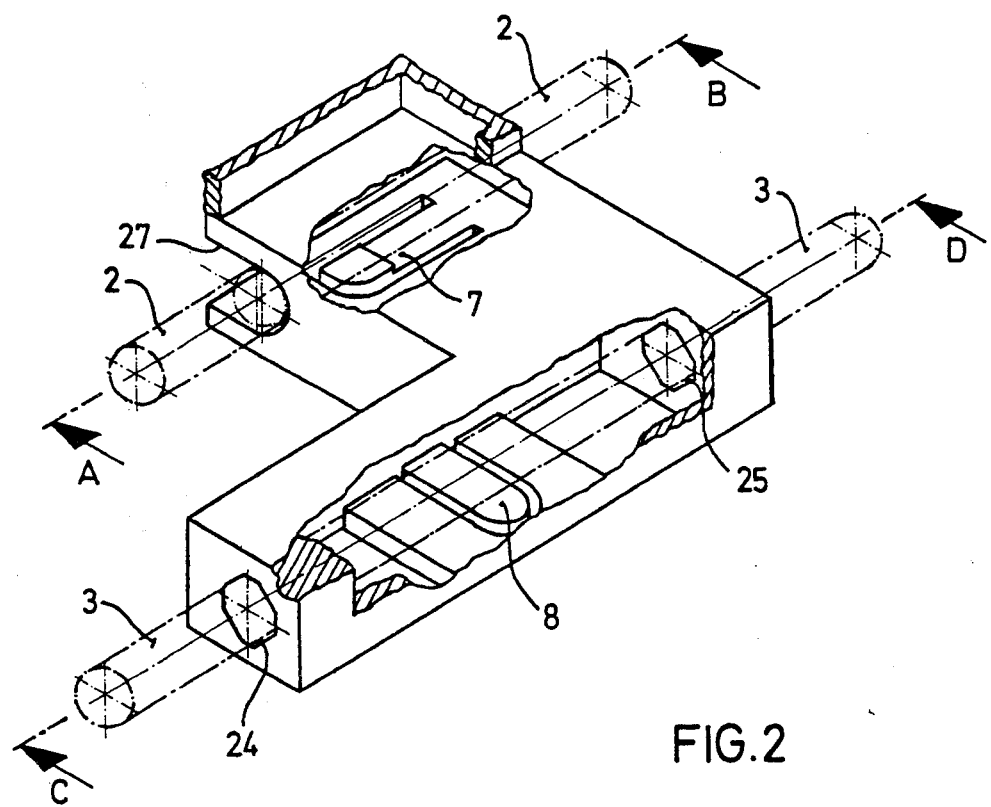

Further details of the invention are disclosed in the following description of the embodiments illustrated in the accompanying drawings, in which FIG. 1 is a schematic perspective overall view of a disk file with a carriage according to the invention, FIG. 2 shows the carriage according to FIG. 1, without the magnetic head, FIGS. 3a-d show part-sections of FIG. 2, and FIGS. 4-7 show further embodiments of carriages, in cross section and in plan view.

A processing unit 20 for disk records, for example floppy disks 19, consists essentially of a clamping and drive mechanism 18, support and guide means for a carriage, and the magnetic head unit 23.

In the present embodiment, the support and guide means consist of two parallel guide rods 2 and 3, which are secured by means of sheet-metal clamping members and screws 21a and 21b to parts 22 of the housing. To minimize costs, the guide rods 2 and 3 are of circular cross section. A carriage 1 with magnetic head unit 23 is slidably mounted on the guide rods 2 and 3, so that the magnetic head 17 can be displaced radially over the surface of the magnetic disk 19, as a result of which data can be written onto, or read from, the disk.

The carriage 1 possesses prism-shaped bores 24 and 25, which advantageously are square or lozenge-shaped, the lines of contact being generatrices on the guide rod 3, the generatrices bearing reference numerals 5 and 6. FIG. 2 shows that the prism-shaped bores 24 and 25 are provided in relatively short bearings 10 and 11 of the carriage 1. Leaf springs 7 and 8, which are advantageously integrally molded onto the underside of the partially hollow plastic body of the carriage 1, press the carriage 1 upward in the direction of the arrows a and b (see FIG. 3), so that the rods 2 and 3 rest against the generatrix 4 of the aperture 27 and generatrices 5 and 6 of the bores 24 and 25.

The shapes of the springs 7 and 8 can best be seen from FIGS. 3a-d.

A pin cooperates with the spiral groove of a disk which is not shown, and the stepwise rotation of which brings about the translational movement of the carriage 1 and hence of the head unit 23. A stop pin makes contact with the housing 22 when the head reaches its innermost position and thus limits the inward travel of the head 23. FIGS. 3a and 3c show that the effective members 7a and 8a of the leaf springs 7 and 8 are thickened. The leaf spring 7 in FIGS. 3a and 3b is located axially, as in FIGS. 2 and 1. By contrast, FIGS. 5 and 6 and 7 respectively show embodiments of carriages in which both springs 7 and 8' and 12 are located, and act, transversely to the axes of the rods 2 and 3.

Figure 4:
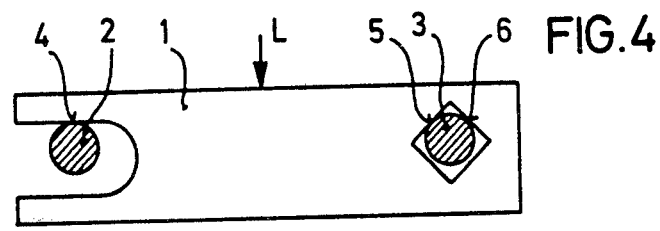
Figure 5:
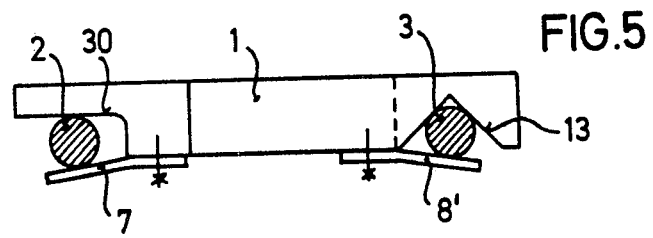
Figure 6:
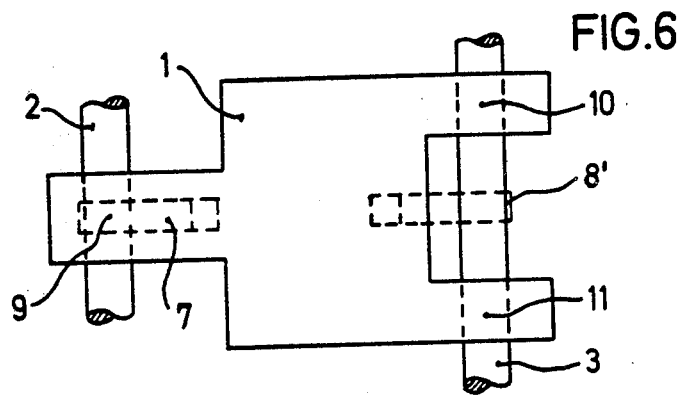
Figure 7:
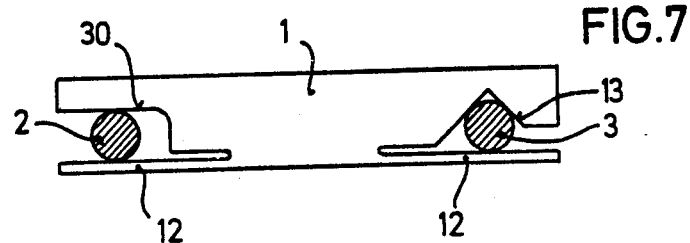

Whilst FIG. 4 shows a cross section of the embodiment, according to FIGS. 1 and 2, under a load acting in the direction of the arrow L, FIGS. 5 to 7 relates to different embodiments. In FIG. 4, the position of the rods 2 and 3 is shown in more detail, and the sole lines of contact 4 and 5 and 6 with the aperture and with the prism-shaped bore 24 respectively can be seen clearly. FIG. 5 shows an embodiment with separate leaf springs 7 and 8', which consist of a suitable material and can be secured in a suitable manner, for example by means of screws. A roof-shaped groove 13 gives a comparable double line of contact with the rod 3, and a recess 30 gives the same single line of contact as in FIG. 4. In FIG. 6, the spring 8' is located centrally between the bearing members 10 and 11. FIG. 7 shows a further embodiment of the carriage with a groove 13 and recess 30 in combination with integrally molded tonguelike springs 12.

The pressure exerted by all the leaf springs 7, 8, 8' and 12 described above must be such that all tilting moments about the axes of the rods 2 and 3, which act on the carriage 1, cannot lift the carriage off the lines of contact 4, 5 and 6. As a result of the carriage 1 having bearings at three points, i.e. at points 9, 10 and 11, the carriage 1 cannot tilt in any direction and is guided without play in every direction. Although quadrilateral or triangular prism shapes have been described above, other polygonal prism shapes can also be used. What is important is that the lines of contact with the guide rods should be symmetrical with respect to the axis of the spring force. The fit between the prism-shaped bore or groove and the guide rod must be so selected that the leaf springs, regardless of the material of construction used, are not over-stressed, i.e. that they are not stressed beyond their elastic limit. Suitable materials, which can be injection-molded economically, are glass-fiber-reinforced polycarbonate or glass-fiber-reinforced polyacetal or other similar polymeric plastics.

We claim:

1. In a recording and/or playback apparatus for recording disks, especially flexible magnetic disks in cartridges, said apparatus having a scanning head mounted for translational movement relatively to said disk by means of a carriage,
    a guiding arrangement for said carriage, comprising:
    two parallel cylindrical guide rods, the first supporting and guiding said carriage longitudinally and the second supporting the carriage and guiding the carriage against movement about the axis of the first rod,
    said carriage having for the guidance thereof relatively to said first rod, two coaxially, longitudinally spaced bearing apertures with at least two planar faces extending in cross-section at an angle to each other,
    said carriage having, for the guidance thereof relatively to said second rod, an aperture with a planar surface, and
    said carriage having a first and a second leaf spring urging said faces and said surface against said two rods, respectively,
    said first leaf spring urging the carriage with said two planar faces into engagement with said first rod along two parallel lines of contact corresponding to generatrices of said first rod and located generally opposite to, and symmetrically on the two sides, respectively, of the central plane of flexing movement of the first spring, and
    the carriage and both of the leaf springs being integrally molded of plastic material.

2. In a recording and/or playback apparatus a guiding arrangement as claimed in claim 1, wherein said bearing apertures are in the form of triangular, downwardly opening grooves.

3. In a recording and/or playback apparatus a guiding arrangement as claimed in claim 1, wherein said leaf springs are of a design and material such as to prevent said material from being stressed beyond its elastic limit.

4. In a recording and/or playback apparatus a guiding arrangement as claimed in claim 15, wherein the leaf spring cooperating with said first guide rod is disposed crosswise of said first rod whereas the leaf spring cooperating with said second guide rod is disposed lengthwise of said second rod.

5. In a recording and/or playback apparatus a guiding arrangement as claimed in claim 1, wherein said bearing apertures are prism shaped.

* * * * *